(12) United States Patent
Cheng

(10) Patent No.: US 12,308,654 B2
(45) Date of Patent: May 20, 2025

(54) WIRELESS CHARGING APPARATUS WITH EMBEDDED FUNCTION

(71) Applicant: Chia-Yin Cheng, Taoyuan (TW)

(72) Inventor: Chia-Yin Cheng, Taoyuan (TW)

( * ) Notice: Subject to any disclaimer, the term of this patent is extended or adjusted under 35 U.S.C. 154(b) by 730 days.

(21) Appl. No.: 17/585,692

(22) Filed: Jan. 27, 2022

(65) Prior Publication Data

US 2022/0255370 A1 Aug. 11, 2022

(30) Foreign Application Priority Data

Feb. 8, 2021 (TW) .................................. 110104783

(51) Int. Cl.
*H02J 50/00* (2016.01)
*H02J 50/10* (2016.01)
*H02J 50/40* (2016.01)
*H02J 50/80* (2016.01)
*H01R 13/66* (2006.01)
*H01R 31/06* (2006.01)

(52) U.S. Cl.
CPC ............ *H02J 50/005* (2020.01); *H02J 50/10* (2016.02); *H02J 50/402* (2020.01); *H02J 50/80* (2016.02); *H01R 13/665* (2013.01); *H01R 31/065* (2013.01); *H02J 2310/22* (2020.01)

(58) Field of Classification Search
CPC .......... H02J 50/005; H02J 50/10; H02J 50/80; H02J 50/402; H02J 2310/22; H01R 13/665; H01R 31/065

USPC .......................... 320/107, 108, 113, 115, 134
See application file for complete search history.

(56) References Cited

U.S. PATENT DOCUMENTS

| | | | | |
|---|---|---|---|---|
| 8,169,185 B2* | 5/2012 | Partovi | ................. | H02J 50/005 320/108 |
| 2013/0005252 A1* | 1/2013 | Lee | ......................... | H02J 50/402 307/18 |
| 2014/0247148 A1* | 9/2014 | Proud | ...................... | H02J 50/20 340/870.02 |
| 2015/0137762 A1* | 5/2015 | Kim | ........................ | F21V 7/0066 320/115 |
| 2015/0188359 A1* | 7/2015 | Park | ........................ | H02J 50/10 320/108 |
| 2017/0302097 A1* | 10/2017 | Kim | ........................ | H02J 50/10 |
| 2017/0302098 A1* | 10/2017 | Miller | ..................... | H02J 7/342 |
| 2018/0227017 A1* | 8/2018 | Lee | .......................... | H02J 50/80 |
| 2019/0027953 A1* | 1/2019 | Rohmer | ................ | H02J 7/0044 |

\* cited by examiner

*Primary Examiner* — Edward Tso
*Assistant Examiner* — Aaron Piggush
(74) *Attorney, Agent, or Firm* — Chun-Ming Shih; HDLS IPR SERVICES

(57) ABSTRACT

A wireless charging apparatus with an embedded function is embedded in a power supply socket to wirelessly charge an electronic device. The wireless charging apparatus includes a case, a charging module, and a wireless charging assembly. The wireless charging apparatus includes a power conversion circuit, a communication module, and a controller. The controller realizes a demand voltage of the electronic device according to a handshaking signal to control the power conversion circuit to adjust an output voltage to meet the demand voltage.

10 Claims, 13 Drawing Sheets

WIRELESS CHARGING APPARATUS WITH EMBEDDED FUNCTION

BACKGROUND

Technical Field

The present disclosure relates to a wireless charging apparatus, and more particularly to a wireless charging apparatus with an embedded function.

Description of Related Art

The statements in this section merely provide background information related to the present disclosure and do not necessarily constitute prior art.

Nowadays, as electronic devices pay more and more attention to the convenience of charging, and more and more electronic devices use adapters to couple to the mains socket for charging. Especially portable products, for example, but not limited to, mobile phones, tablets, and other products have generally used adapters for charging. However, the disadvantage of using the adapter to charge the electronic device is that the connector of the adapter often needs to correspond to the connection port of the electronic device before it can be smoothly plugged for charging, which causes inconvenience in use.

On the other hand, since electronic devices often have to be paired with an adapter to be successfully charged, it will cause inconvenience in charging the electronic device when there is no adapter or the adapter happens to be faulty. Moreover, the path for the adapter to be coupled to the electronic device usually has a wire for transmitting power or signal. During charging, since the wires will be placed randomly, it will cause visual unsightly. Especially if it is placed on road where people walk, there is a risk of tripping.

Although more and more electronic devices have the function of power delivery (PD) nowadays, it usually requires a specific adapter for charging (that is, the adapter must also have the function of power delivery). Therefore, considering the above-mentioned situations, there is still no charging device capable of charging an electronic device with a power supply function, and achieving convenience in use and aesthetic appearance.

SUMMARY

In order to solve the above-mentioned problems, the present disclosure provides a wireless charging apparatus with an embedded function. The wireless charging apparatus with the embedded function is embedded in a power supply socket, and wirelessly charges an electronic device. The wireless charging apparatus includes a case, a charging module, and a wireless charging assembly. The case is embedded in the power supply socket, and the case includes a plug hole for a power line to be plugged into. The charging module is coupled to the power line, and the charging module includes a power conversion circuit, a communication module, and a controller. The power conversion circuit receives an input voltage through the power line, and converts the input voltage into an output voltage. The communication module performs a handshaking communication with the electronic device to provide a handshaking signal. The controller is coupled to the power conversion circuit and the communication module, and receives the handshaking signal. The wireless charging assembly includes a power coil, and the power coil is coupled to the power conversion circuit to wirelessly transmit the output voltage to the electronic device. After the wireless charging apparatus is activated, the controller controls the power conversion circuit to convert the input voltage into the implied output voltage, and the controller realizes a demand voltage of the electronic device according to the handshaking signal; the controller controls the power conversion circuit according to the demand voltage to adjust the implied output voltage to meet the demand voltage.

In one embodiment, the communication module performs the handshaking communication with the electronic device by a digital modulation manner.

In one embodiment, the digital modulation manner is a frequency-shift keying.

In one embodiment, the controller is a power transmission controller conforming to a USB power transmission specification.

In one embodiment, the communication module includes a communication antenna or a communication coil, and the communication antenna or the communication coil and the power coil are packaged as a wireless module.

In one embodiment, the wireless charging assembly is an accommodation seat body; the accommodation seat body is coupled to the case, and the power coil is accommodated on one surface of the accommodation seat body.

In one embodiment, the case includes a sliding part and the accommodation seat body is coupled to the sliding part. The sliding part is used for the accommodation seat body to move outwardly or inwardly relative to the case, and when the accommodation seat body moves inwardly, the accommodation seat body and the case are embedded to form a closed body.

In one embodiment, the accommodation seat body is pivotally connected to the case so that the accommodation seat body is turned outwardly or folded inwardly relative to the case, and when the accommodation seat body is folded inwardly, the accommodation seat body and the case are embedded to form a closed body.

In one embodiment, the wireless charging assembly is a bearing seat body, and the bearing seat body is coupled to the case.

In one embodiment, the bearing seat body is pivotally connected to the case so that the bearing seat body is turned outwardly or folded inwardly relative to the case, and when the bearing seat body is folded inwardly, the bearing seat body and the case are embedded to form a closed body.

In one embodiment, the wireless charging assembly includes a charging body and a clamping component. The charging body is coupled to the charging module, and accommodates the power coil. The clamping component is coupled to the charging body, and clamps the electronic device.

In one embodiment, the wireless charging assembly includes a charging body and an attaching part. The charging body is coupled to the charging module, and accommodates the power coil. The attaching part is coupled to the charging body, and attaches the electronic device.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
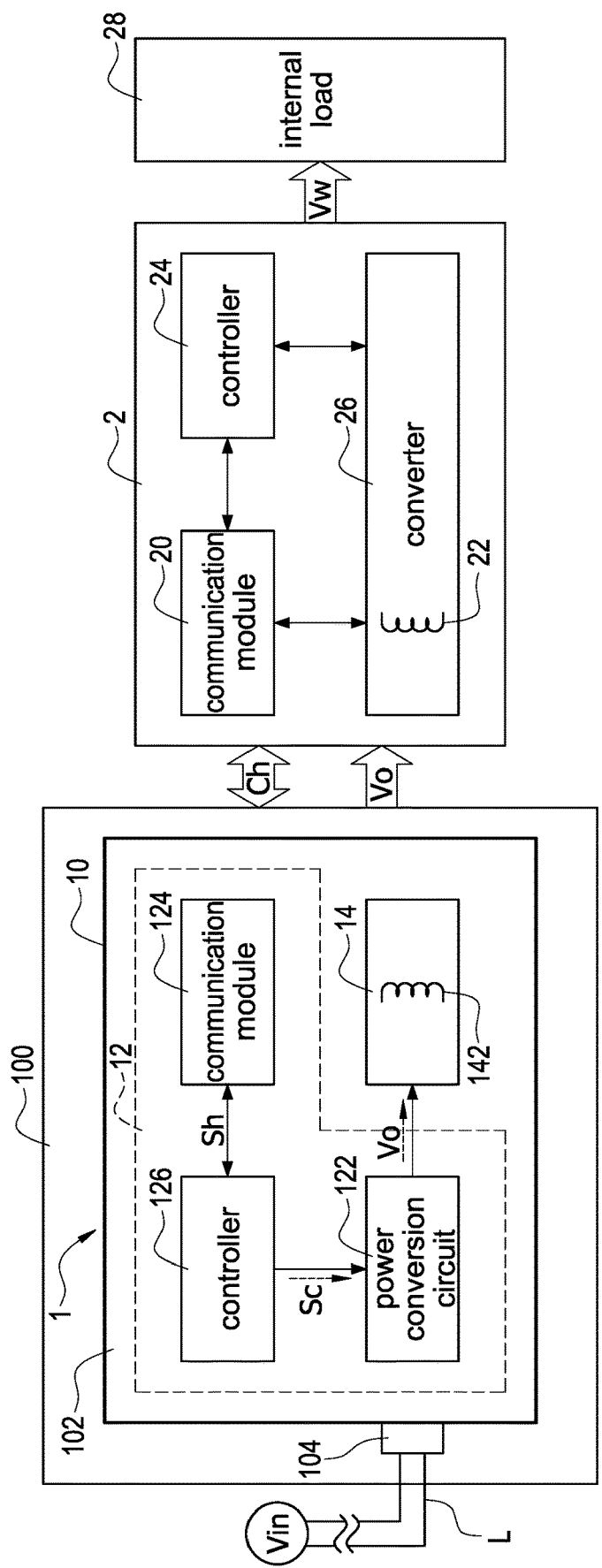
FIG. 1 is a block diagram of a wireless charging apparatus with an embedded function according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block diagram of a wireless charging apparatus with an embedded function according to the present disclosure. The wireless charging apparatus 1 is embedded in a power supply socket 100, and wirelessly charges an electronic device 2. The power supply socket 100 may be arranged on a vertical surface, such as a wall surface, or on a horizontal surface, such as a desktop surface. The electronic device 2 may be a portable device, such as, but limited to, a mobile phone, a tablet, etc. The wireless charging apparatus 1 includes a case 10, a charging module 12, and a wireless charging assembly 14. The case 10 is embedded in the power supply socket 100. The case 10 includes a case accommodation space 102 and a plug hole 104, and the case accommodation space 102 is used to accommodate the charging module 12 and the wireless charging assembly 14. The plug hole 104 is used for a power line L to be plugged (inserted) into and connected to the charging module 12 so that the charging module 12 receives an input voltage Vin provided from the power line L. The charging module 12 includes a power conversion circuit 122, a communication module 124, and a controller 126. The power conversion circuit 122 receives the input voltage Vin through the power line L, and converts the input voltage Vin into an output voltage Vo. In one embodiment, the power conversion circuit 122 may be a switching converter, for example, but not limited to, a flyback converter.

The communication module 124 is used to performs a handshaking communication Ch with a communication module 20 of the electronic device 2, and provides a handshaking signal Sh according to the communication content. The controller 126 is coupled to the communication module 124 and the power conversion circuit 122, and the controller 126 realizes the power information and the power demand of the electronic device 2 according to the handshaking signal Sh, and provides a control signal Sc to control the power conversion circuit 122 to convert the input voltage Vin into the output voltage Vo. The wireless charging assembly 14 includes a power coil 142. The power coil 142 is coupled to an output end of the power conversion circuit 122 and a receiver coil 22 of the electronic device 2 so as to wirelessly transmit the received output voltage Vo to the receiver coil 22 of the electronic device 2 to charge the electronic device 2.

Moreover, the controller 126 of the wireless charging apparatus 1 and a controller 24 of the electronic device 2 are power delivery (PD) controllers conforming to the USB power delivery (USB-PD) specification. After the wireless charging apparatus 1 is activated (started), the controller 126 controls the power conversion circuit 122 to convert the input voltage Vin into the implied output voltage Vo. When the electronic device 2 is to be charged and coupled to the wireless charging apparatus 1, the controllers 126, 24 make each other realize the power information through the handshaking communication Ch of the communication modules 124, 20, and the controller 126 realizes a demand voltage of the electronic device 2 according to the handshaking signal Sh provided by the communication module 124. Afterward, the controller 126 controls the power conversion circuit 122 to adjust the output voltage Vo to meet the demand voltage. In particular, the adjustment range of the output voltage Vo is, for example, but not limited to, 3 to 20 volts. The receiver coil 22 of the electronic device 2 receives the output voltage Vo of 20 volts, and the controller 24 of the electronic device 2 controls a convert 26 to convert the output voltage Vo of 20 volts into a working voltage Vw required for the operation of an internal load 28.

For example, it is assumed that the demand voltage of the electronic device 2 is 20 volts. After the wireless charging apparatus 1 is activated (started), the controller 126 controls the power conversion circuit 122 to convert the input voltage Vin into the implied output voltage Vo of 5 volts. Afterward, when the electronic device 2 is to be charged and coupled to the wireless charging apparatus 1, the controllers 126, 24 make each other realize the power information through the handshaking communication Ch of the communication modules 124, 20, and the controller 126 realizes the demand voltage of 20 volts of the electronic device 2 according to the handshaking signal Sh provided by the communication module 124. Afterward, the controller 126 controls the power conversion circuit 122 to adjust the output voltage Vo of 5 volts to 20 volts to meet the demand voltage of the electronic device 2.

Figure 2A:
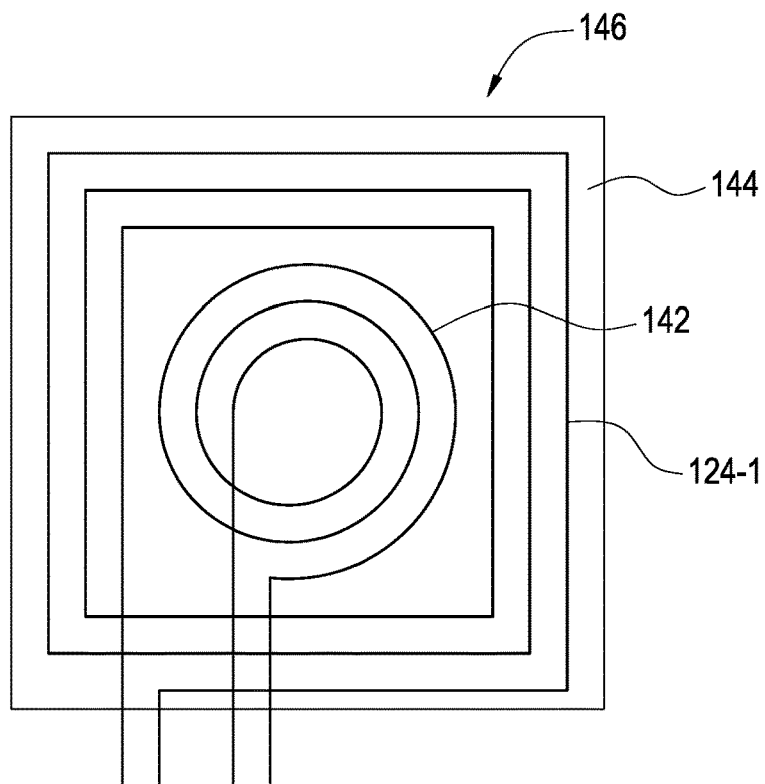
FIG. 2A is a schematic diagram of a coil package structure according to a first embodiment of the present disclosure.
Figure 2B:
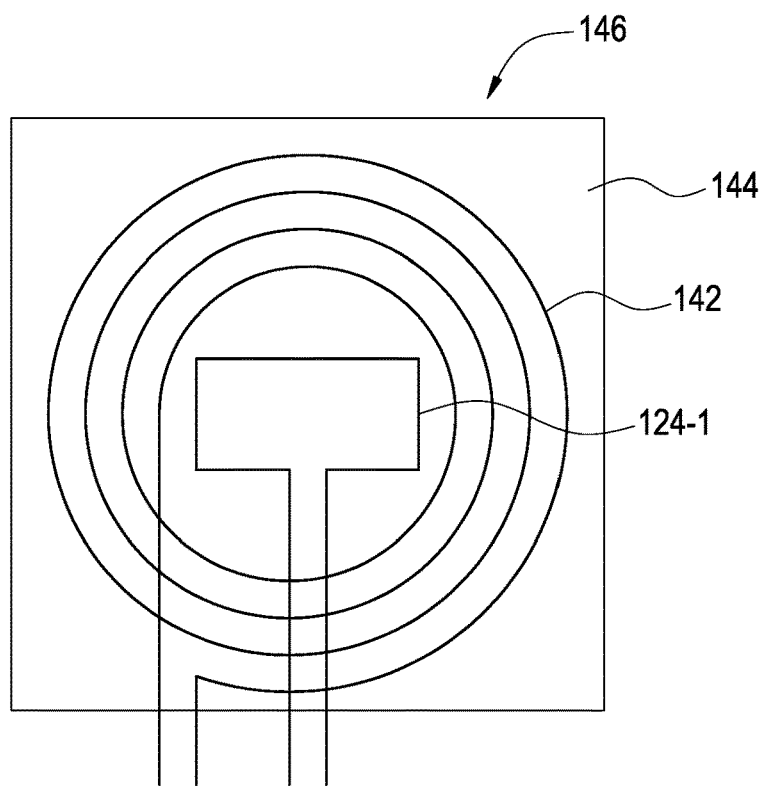
FIG. 2B is a schematic diagram of the coil package structure according to a second embodiment of the present disclosure.
Figure 2C:
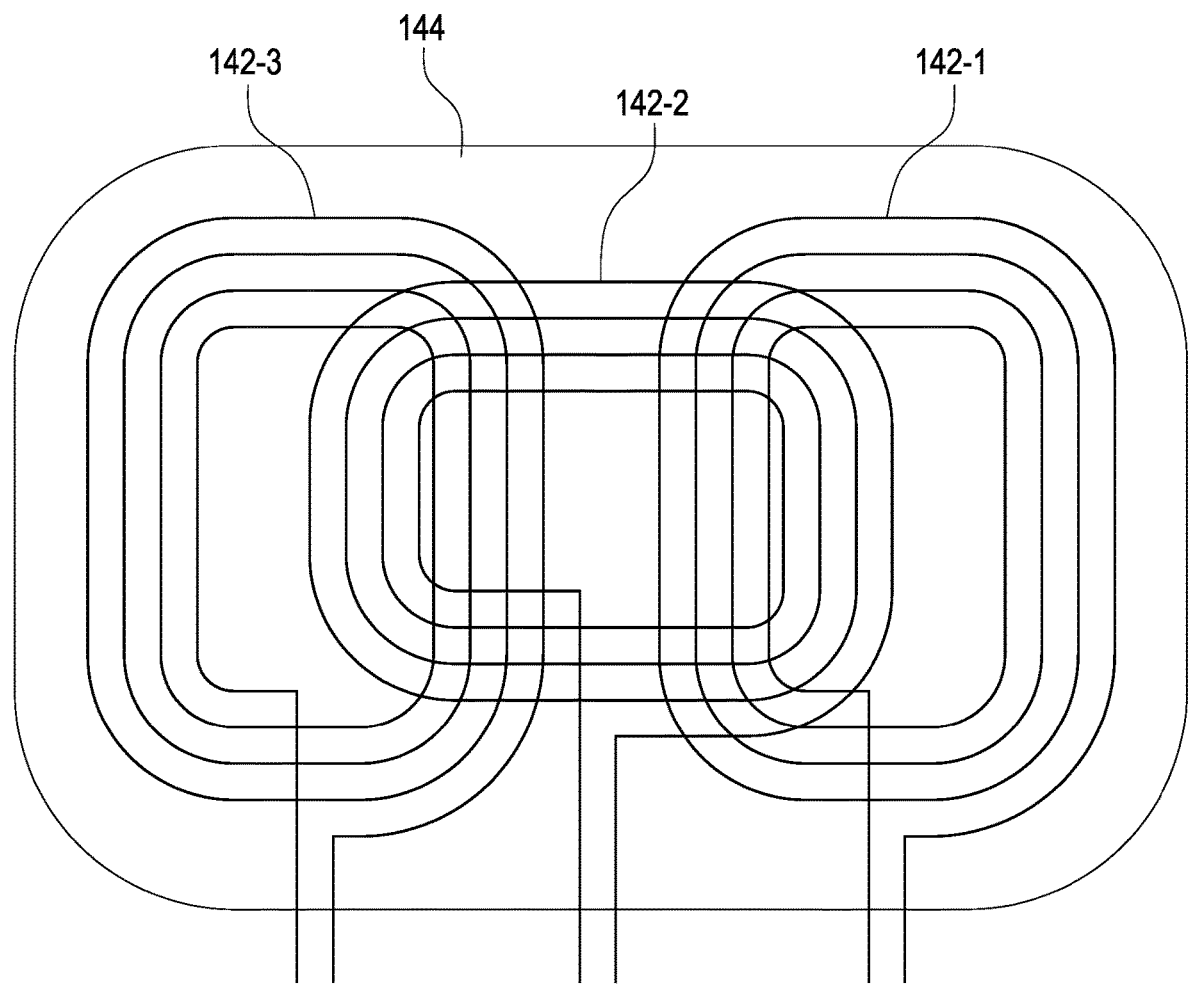
FIG. 2C is a schematic diagram of the coil package structure according to a third embodiment of the present disclosure.

Please refer to FIG. 2A, which shows a schematic diagram of a coil package structure according to a first embodiment of the present disclosure; FIG. 2B, which shows a schematic diagram of the coil package structure according to a second embodiment of the present disclosure; FIG. 2C, which shows a schematic diagram of the coil package structure according to a third embodiment of the present disclosure, and also refer to FIG. 1. The communication module 124 includes a transmission apparatus 124-1. In addition, a device for transmitting and receiving signals may be a communication antenna or a communication coil. The communication module 124 may transmit wireless signals through the communication antenna (for example, but not limited to, a microstrip antenna) or the communication coil. In one embodiment, the communication module 124 performs a handshaking communication Ch with the electronic device 2 by a digital modulation manner. Specifically, the digital modulation manner may be one of an amplitude-shift keying (ASK), a frequency-shift keying (FSK), a phase-shift keying (PSK), a quadrature amplitude modulation (QAM), and an orthogonal frequency-division multiplexing (OFDM). In the present disclosure, the frequency-shift keying (FSK) is preferably used as the transmission of the wireless signals of the wireless charging apparatus 1, which makes the controllers 126, 24 can more accurately determine whether the wireless digital signal is "0" or "1".

In FIG. 2A, the transmission apparatus 124-1, for example, but not limited to, a communication coil. The communication coil is wound in a rectangular shape, and the power coil 142 is wound in a circular shape. The power coil 142 is disposed inside the communication coil, and the power coil 142 and the communication coil are encapsulated (packaged) together by an encapsulant 144 (for example, but not limited to, a resin) to form a modular wireless module 146. In FIG. 2B, the transmission apparatus 124-1, for example, but not limited to, the microstrip antenna. The microstrip antenna is wound in a rectangular shape, and the power coil 142 is wound in a circular shape. The power coil 142 is disposed outside the communication coil, and the power coil 142 and the communication coil are encapsulated (packaged) together by the encapsulant 144 (for example, but not limited to, a resin) to form a modular wireless module 146. In FIG. 2C, the power coil 142 includes three coils 142-1 to 142-3, and the three coils 142-1 to 142-3 are encapsulated (packaged) together by the encapsulant 144 (for example, but not limited to, a resin). In particular, the features of the embodiments of FIG. 2A to FIG. 2C may be used in combination with each other, and the detail description is omitted here for conciseness. By forming the wireless module 146 with the transmission apparatus 124-1 and the power coil 142, the effect of making the process of the wireless charging apparatus 1 more convenient can be achieved.

Figure 3A:
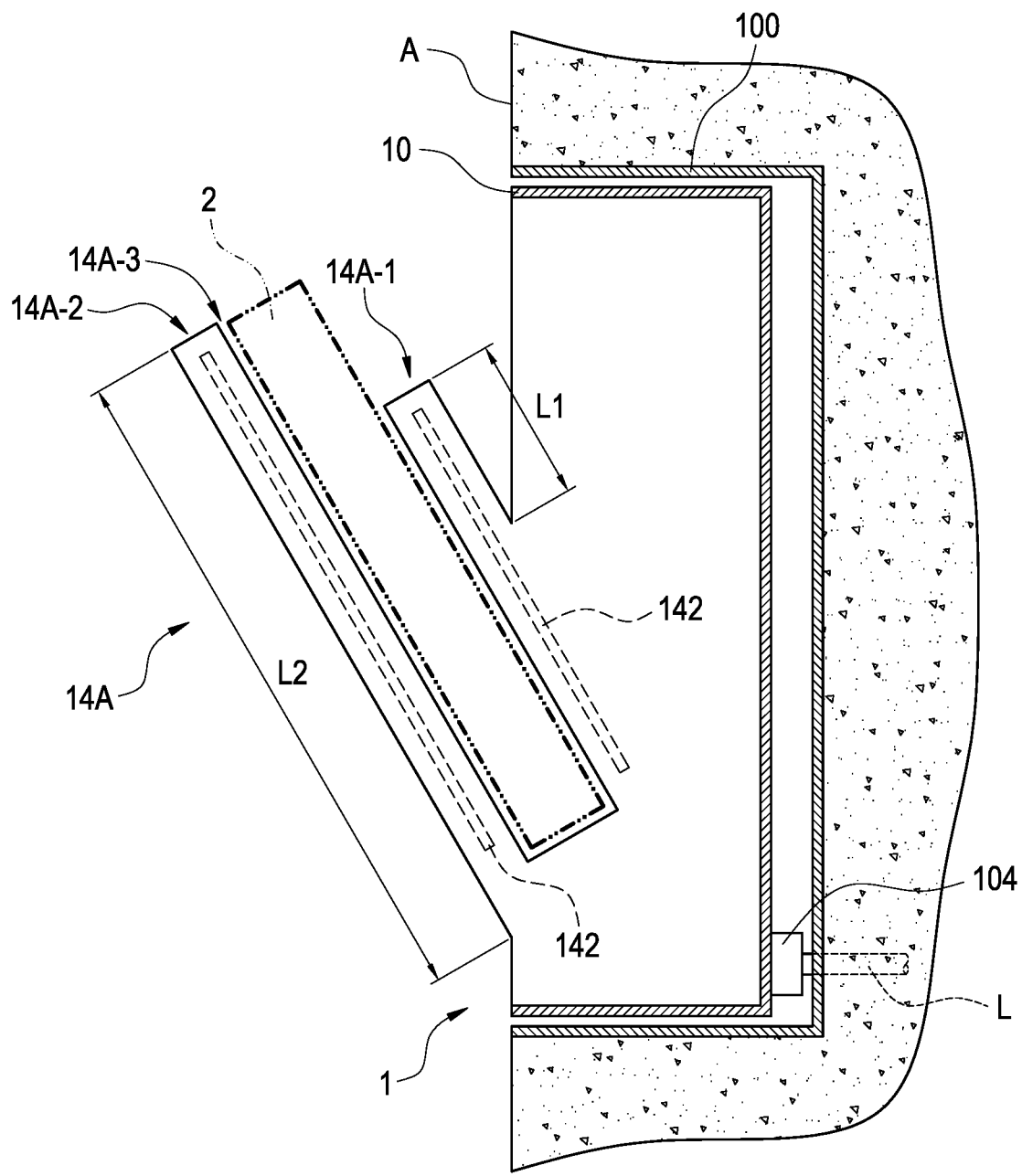
FIG. 3A is a schematic structure diagram of the wireless charging apparatus according to a first embodiment of the present disclosure.

Please refer to FIG. 3A, which shows a schematic structure diagram of the wireless charging apparatus according to a first embodiment of the present disclosure, and also refer to FIG. 1 to FIG. 2C. In this embodiment, the wireless charging apparatus 1 is embedded in the power supply socket 100 arranged on a wall surface A. The wireless charging assembly 14 is an accommodation seat body 14A, and the accommodation seat body 14A is fixedly connected to the case 10. The power coil 142 is accommodated on one surface of the accommodation seat body, for example, accommodated on a top surface 14A-1 or a bottom surface 14A-2, in which, the top surface 14A-1 is higher from the ground than the bottom surface 14A-2. Preferably, a first length L1 of the top surface 14A-1 is less than a second length L2 of the bottom surface 14A-2. Therefore, when the electronic device 2 is placed in an accommodation space 14A-3 of the accommodation seat body 14A, the electronic device 2 is not easy to slip off. In this embodiment, the accommodation space 14A-3 is opened obliquely.

Figure 3B:
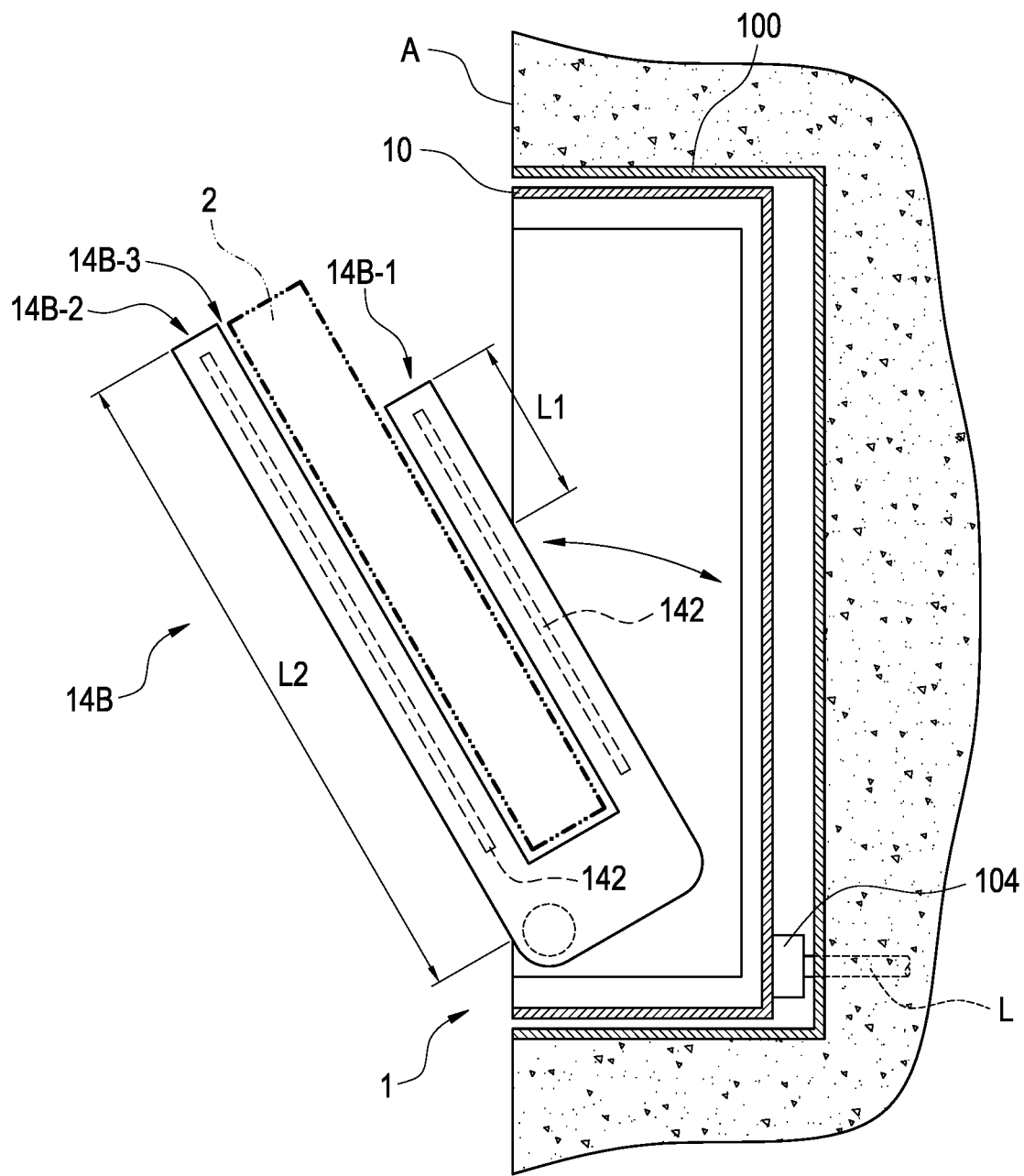
FIG. 3B is a schematic structure diagram of the wireless charging apparatus according to a second embodiment of the present disclosure.

Please refer to FIG. 3B, which shows a schematic structure diagram of the wireless charging apparatus according to a second embodiment of the present disclosure, and also refer to FIG. 1 to FIG. 3A. The difference between the FIG. 3B and the FIG. 3A is that an accommodation seat body 14B is pivotally connected to the case 10 so that the accommodation seat body 14B is turned outwardly or folded inwardly relative to the case 10. When the accommodation seat body 14B is turned outwardly, the electronic device 2 may be placed in an accommodation space 14A-3 of the accommodation seat body 14B. When the accommodation seat body 14B is folded inwardly, the accommodation seat body 14B and the case 10 are embedded to form a closed body. Therefore, the wireless charging apparatus 1 can be hidden so as to achieve the effect of dustproof and make the wall surface A beautiful.

Figure 4A:
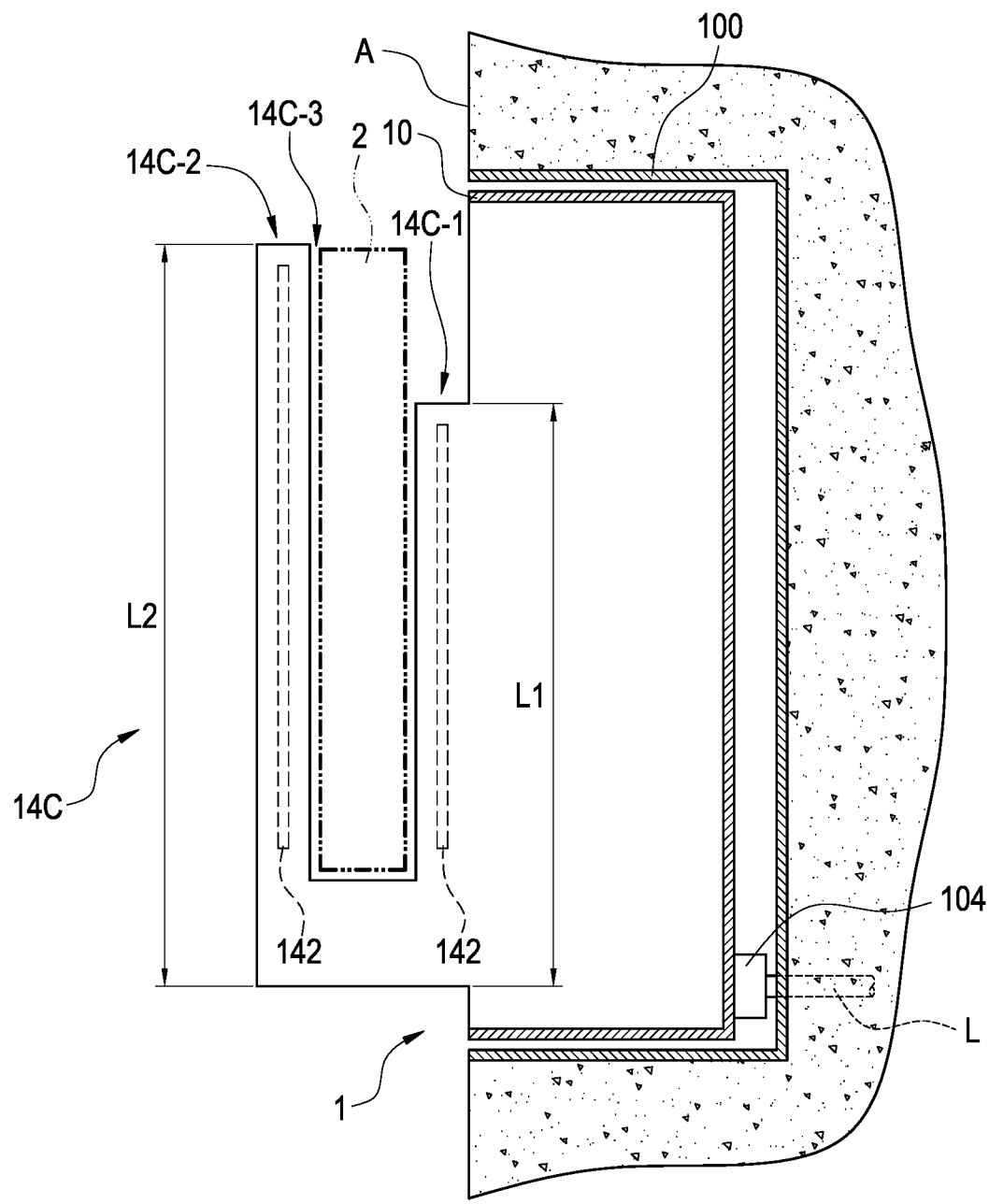
FIG. 4A is a schematic structure diagram of the wireless charging apparatus according to a third embodiment of the present disclosure.

Please refer to FIG. 4A, which shows a schematic structure diagram of the wireless charging apparatus according to a third embodiment of the present disclosure, and also refer to FIG. 1 to FIG. 3B. The difference between the FIG. 4A and the FIG. 3A is that an accommodation space 14C-3 of the accommodation seat body 14C is vertically opened, and the accommodation seat body 14C is fixedly connected to the case 10. The power coil 142 is accommodated on one surface of the accommodation seat body 14C, for example, accommodated on an inner surface 14C-1 or an outer surface 14C-2, in which, the outer surface 14C-2 is farther from the wall surface A than the inner surface 14C-1. Preferably, a first length L1 of the inner surface 14C-1 is less than a second length L2 of the outer surface 14C-2. Therefore, when the electronic device 2 is placed in an accommodation space 14C-3 of the accommodation seat body 14C, the electronic device 2 is not easy to slip off.

Figure 4B:
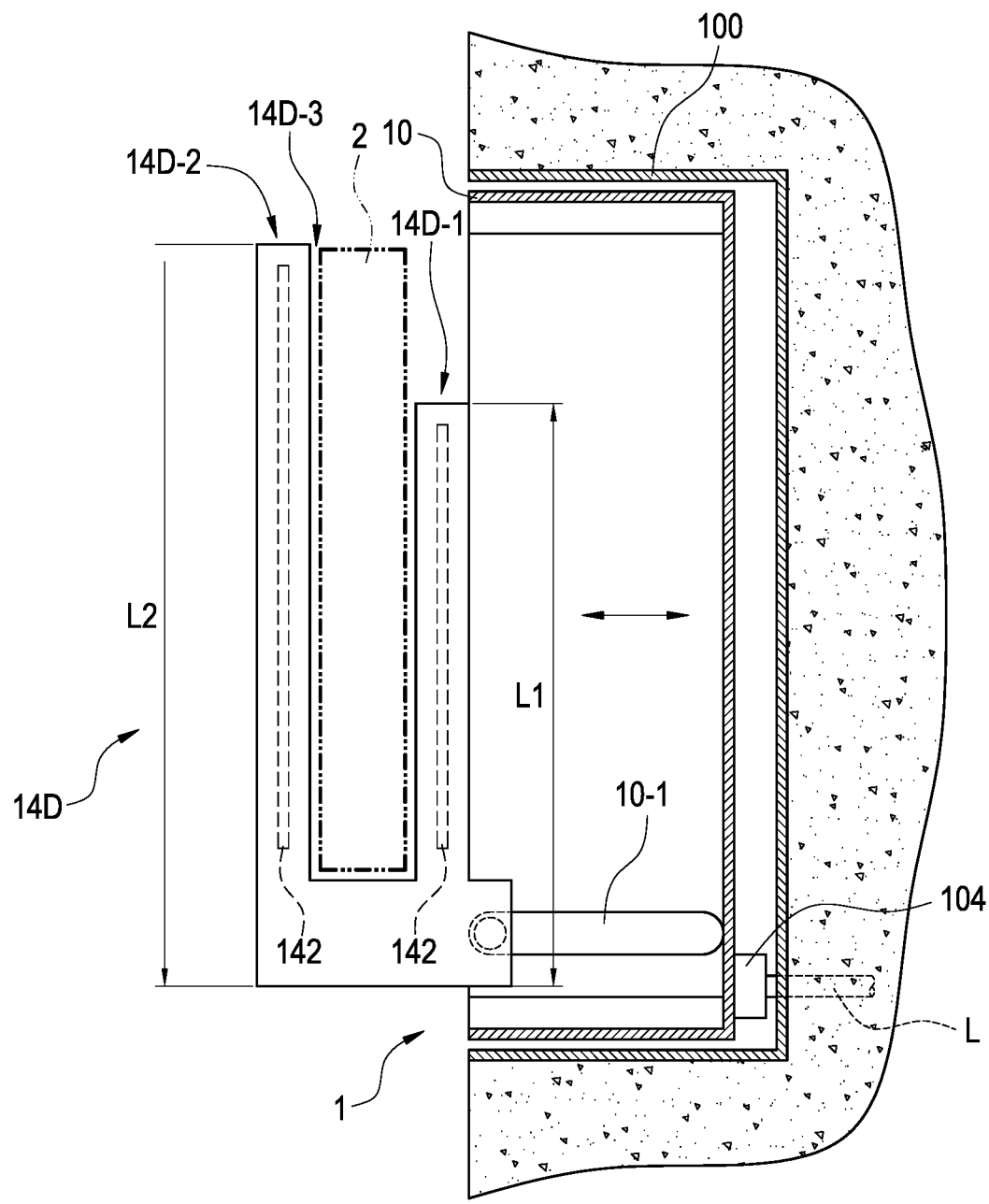
FIG. 4B is a schematic structure diagram of the wireless charging apparatus according to a fourth embodiment of the present disclosure.

Please refer to FIG. 4B, which shows a schematic structure diagram of the wireless charging apparatus according to a fourth embodiment of the present disclosure, and also refer to FIG. 1 to FIG. 4A. The difference between the FIG. 4B and the FIG. 4A is that the case 10 includes a sliding part 10-1, and an accommodation seat body 14D is coupled to the sliding part 10-1. The sliding part 10-1 is used for the accommodation seat body 14D to move outwardly or inwardly relative to the case 10 to activate the charging operation, or move inwardly to fold. When the accommodation seat body 14D moves outwardly, the electronic device 2 is placed in an accommodation space 14D-3 of the accommodation seat body 14D. When the accommodation seat body 14D moves inwardly, the accommodation seat body 14D and the case 10 are embedded to form a closed body. Therefore, the wireless charging apparatus 1 can be hidden so as to achieve the effect of dustproof and make the wall surface A beautiful.

Figure 5A:
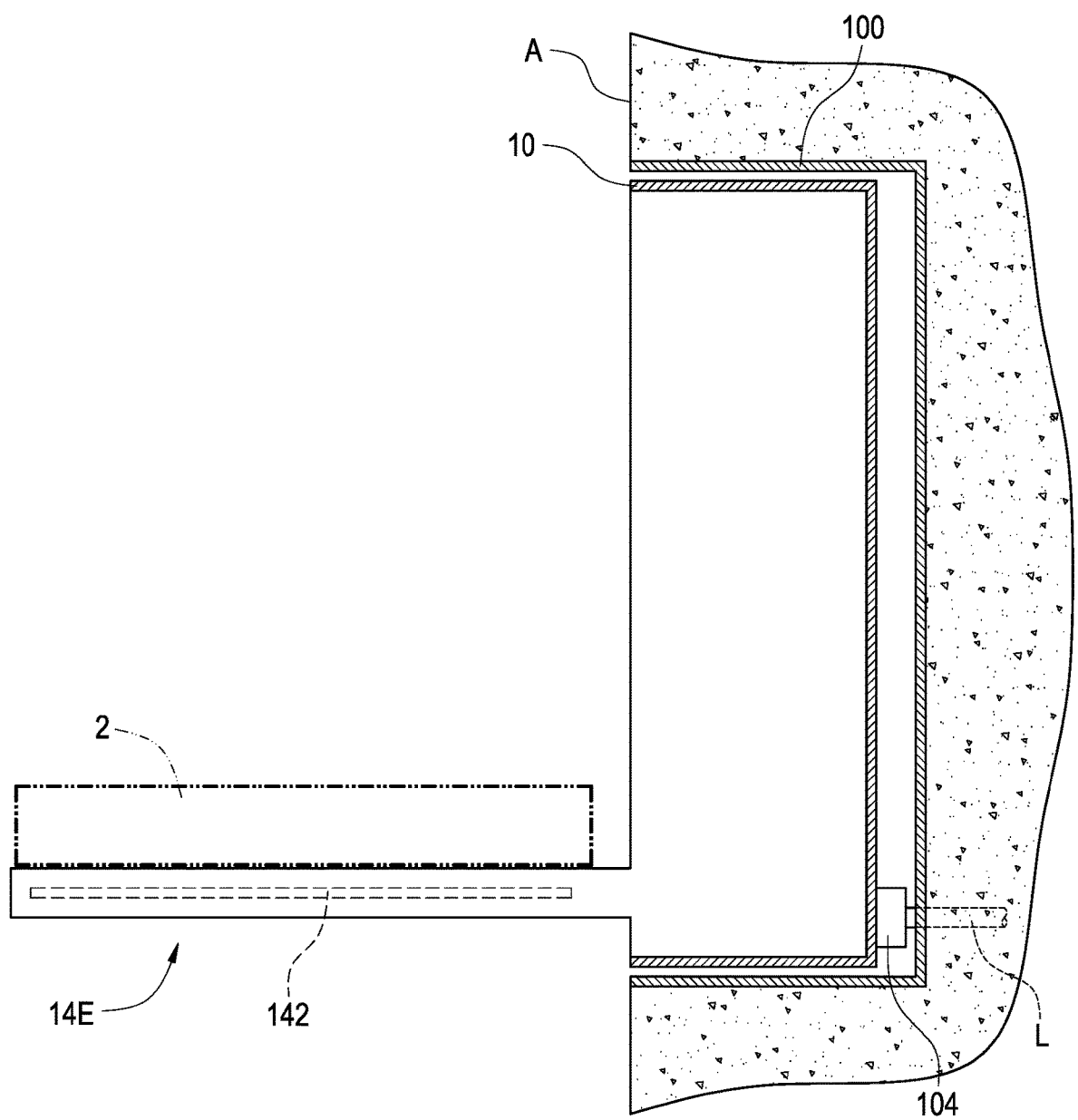
FIG. 5A is a schematic structure diagram of the wireless charging apparatus according to a fifth embodiment of the present disclosure.
Figure 5B:
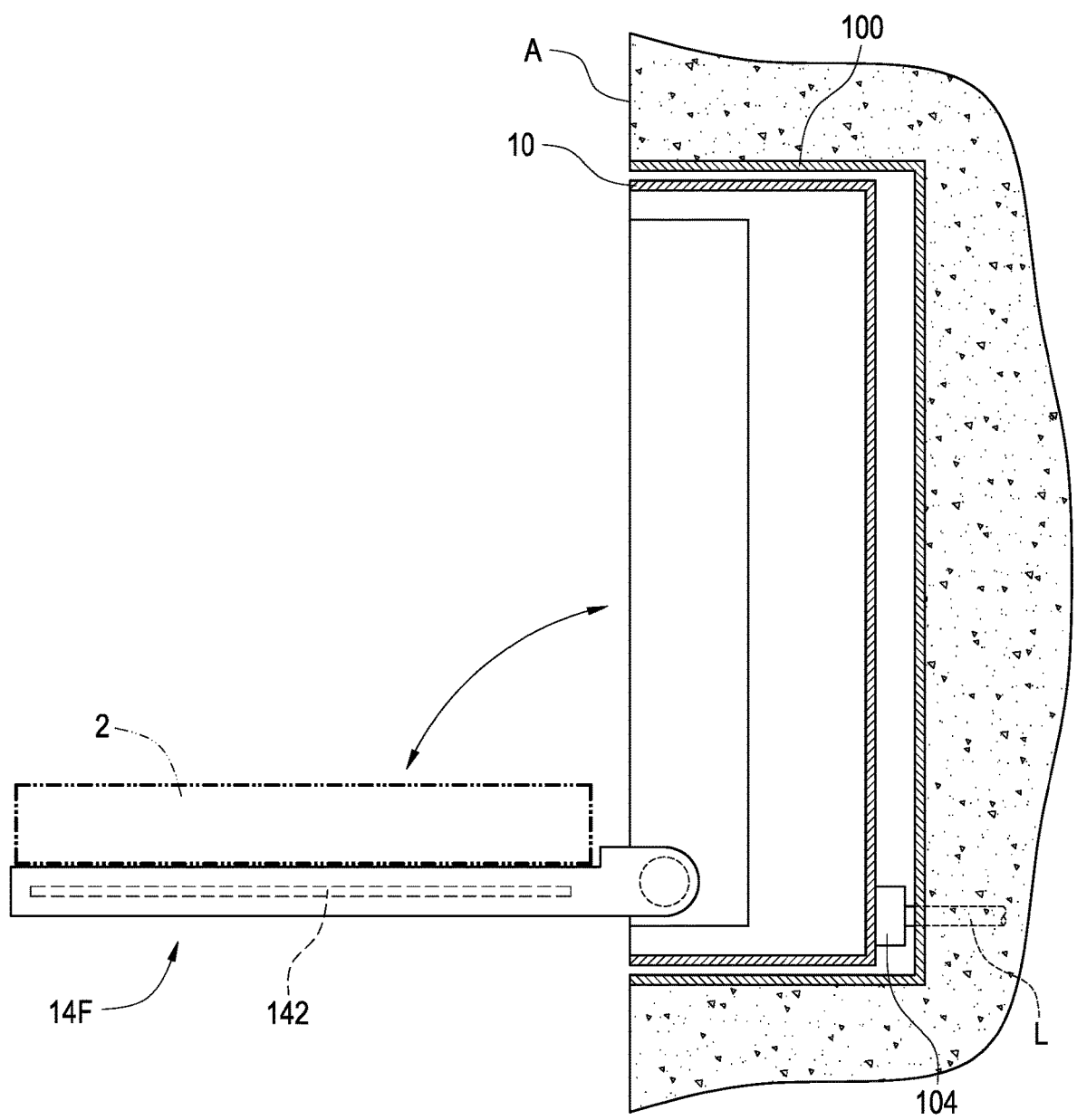
FIG. 5B is a schematic structure diagram of the wireless charging apparatus according to a sixth embodiment of the present disclosure.

Please refer to FIG. 5A, which shows a schematic structure diagram of the wireless charging apparatus according to a fifth embodiment of the present disclosure; FIG. 5B, which shows a schematic structure diagram of the wireless charging apparatus according to a sixth embodiment of the present disclosure, and also refer to FIG. 1 to FIG. 4B. The difference between the FIG. 5A and the FIG. 3A is that the wireless charging assembly 14 is a bearing seat body 14E, and the bearing seat body 14E is coupled to the case 10. The bearing seat body 14E is fixedly connected to the case 10, and the power coil 142 is accommodated in the bearing seat body 14E. The difference between the FIG. 5B and the FIG. 5A is that a bearing seat body 14F is pivotally connected to the case 10 so that the bearing seat body 14F is turned outwardly or folded inwardly relative to the case 10. When the bearing seat body 14F is turned outwardly, the electronic device 2 may be placed on the bearing seat body 14F. When the bearing seat body 14F is folded inwardly, the bearing seat body 14F and the case 10 are embedded to form a closed body. Therefore, the wireless charging apparatus 1 can be hidden so as to achieve the effect of dustproof and make the wall surface A beautiful.

Figure 6A:
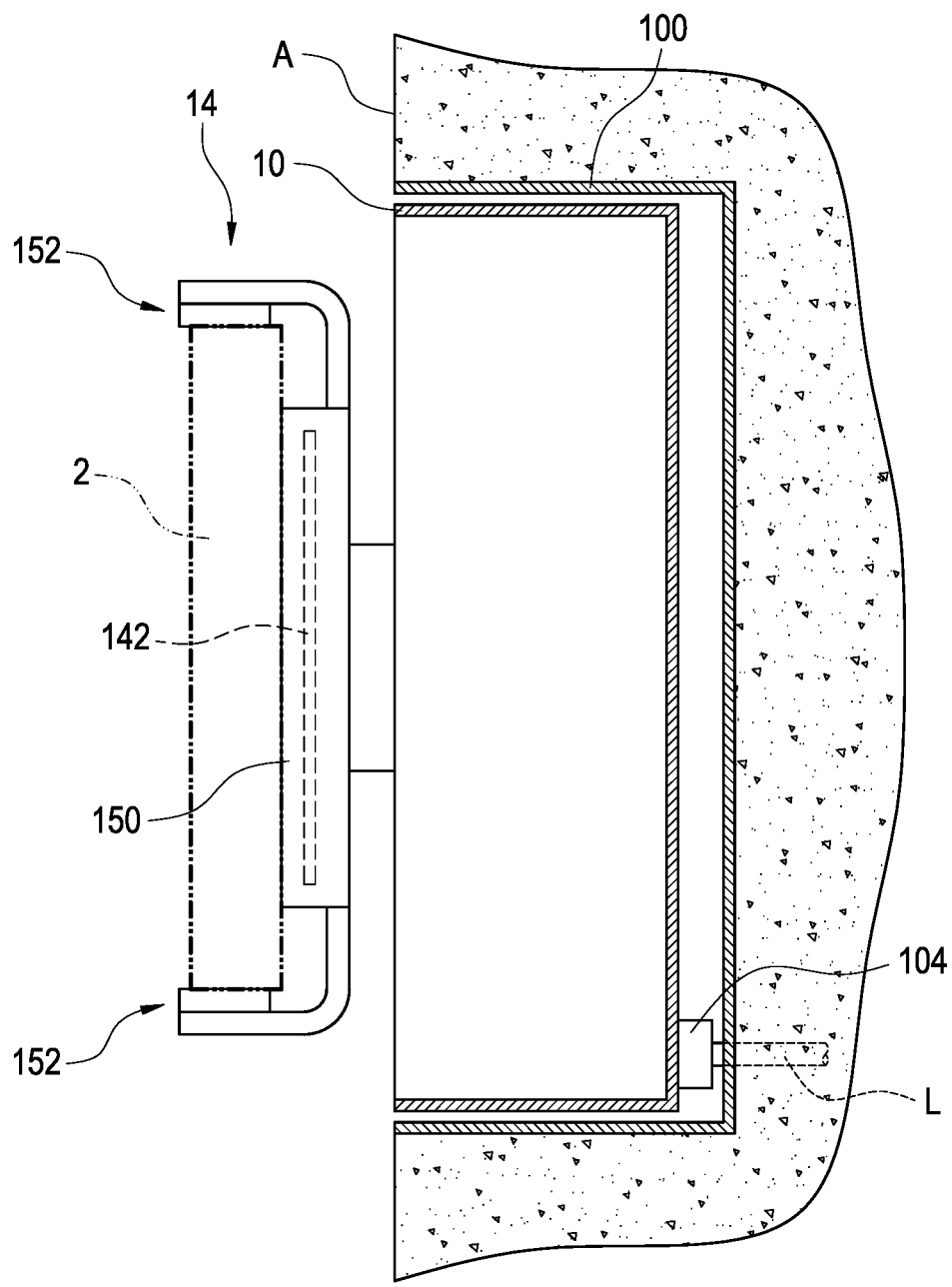
FIG. 6A is a schematic structure diagram of the wireless charging apparatus according to a seventh embodiment of the present disclosure.

Please refer to FIG. 6A, which shows a schematic structure diagram of the wireless charging apparatus according to a seventh embodiment of the present disclosure, and also refer to FIG. 1 to FIG. 5B. The wireless charging assembly 14 includes a charging body 150 and a clamping component 152. The charging body 150 is coupled to the charging module 12, and the charging body 150 is used to accommodate the power coil 142. The clamping component 152 is coupled to the charging body 150, and the clamping component 152 is used to clamp the electronic device 2. In one embodiment, the number of the clamping component 152 is at least one. When the number of the clamping component 152 is one, the charging body 150 includes an engaging part (not shown), and the engaging part is used to clamp the electronic device 2 together with the clamping component 152. When the number of the clamping components 152 is two or more, the two or more clamping components 152 are used to clamp the electronic device 2 together (shown in FIG. 6A). After the electronic device 2 is clamped by the two or more clamping components 152, the wireless charging apparatus 1 can provide the output voltage Vo through the power coil 142 to wirelessly charge the electronic device 2.

Figure 6B:
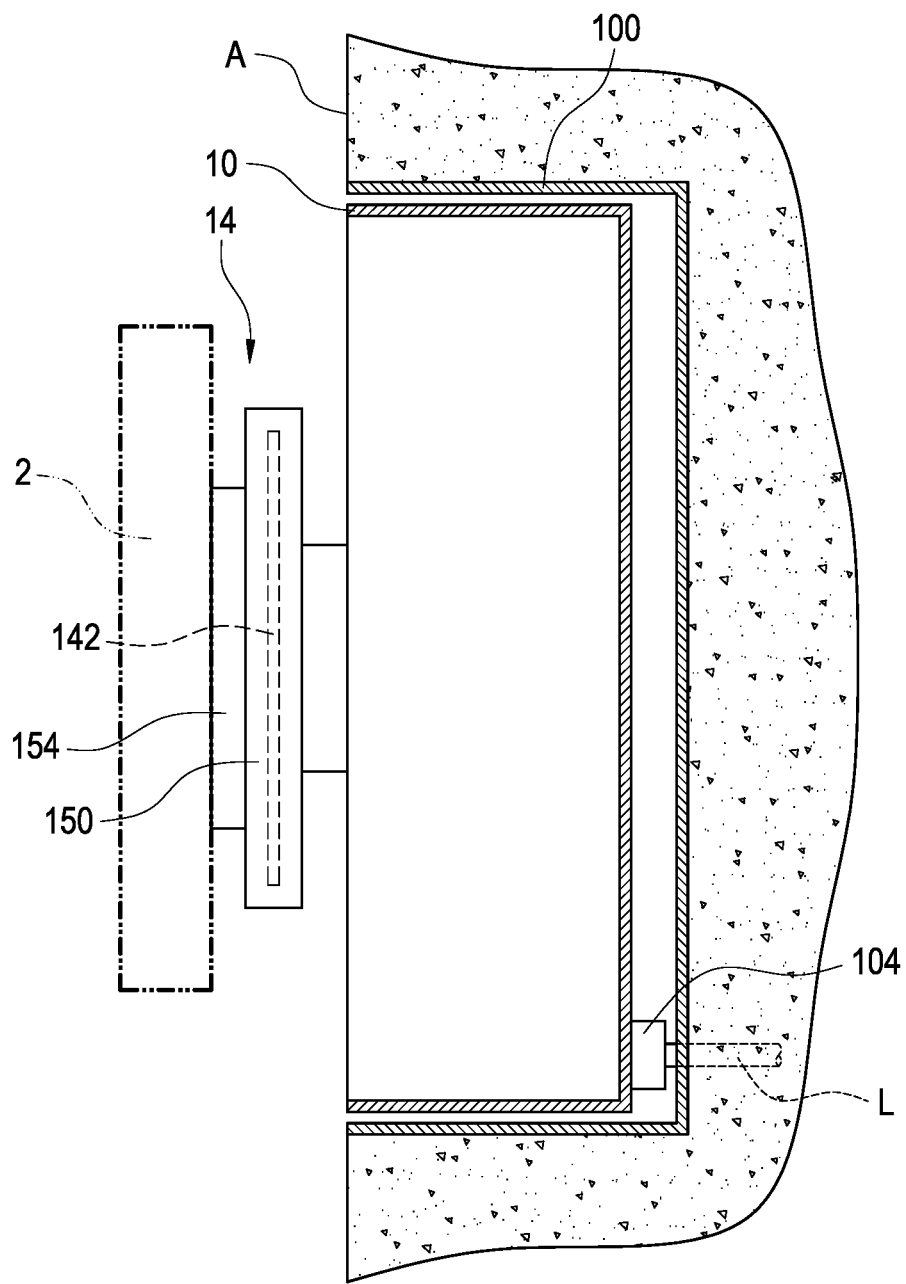
FIG. 6B is a schematic structure diagram of the wireless charging apparatus according to an eighth embodiment of the present disclosure.

Please refer to FIG. 6B, which shows a schematic structure diagram of the wireless charging apparatus according to an eighth embodiment of the present disclosure, and also refer to FIG. 1 to FIG. 6A. The wireless charging assembly 14 includes a charging body 150 and an attaching part 154. The charging body 150 is coupled to the charging module 12, and the charging body 150 is used to accommodate the power coil 142. The attaching part 154 is coupled to the charging body 150, and the attaching part 154 is used to attach the electronic device 2. Specifically, the attaching part 154 may be attached to the electronic device 2 by means of magnetic force, vacuum suction, or material adhesion so as to fix the electronic device 2. After the electronic device 2 is attached by the attaching part 154, the wireless charging apparatus 1 can provide the output voltage Vo through the power coil 142 to wirelessly charge the electronic device 2.

Figure 6C:
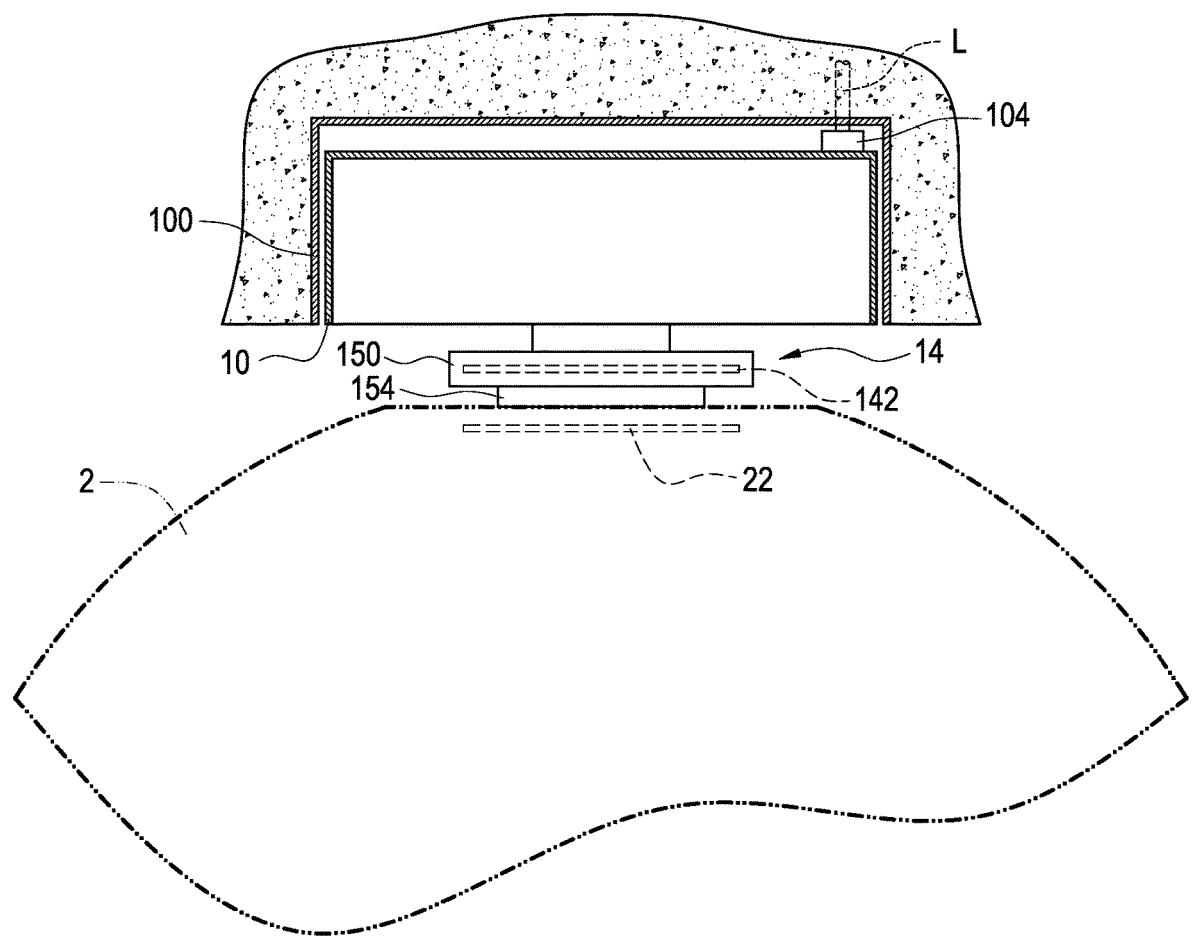
FIG. 6C is a schematic structure diagram of the wireless charging apparatus according to a ninth embodiment of the present disclosure.

Please refer to FIG. 6C, which shows a schematic structure diagram of the wireless charging apparatus according to a ninth embodiment of the present disclosure, and also refer to FIG. 1 to FIG. 6B. The difference between the FIG. 6C and the FIG. 6B is that the electronic device 2 may be an autonomous mobile electronic product, for example, but not limited to, a cleaning robot. The receiver coil 22 and the power coil 142 are also connected to each other by the attaching part 154, thereby achieving the effect of contactless contact and waterproofing.

Figure 6D:
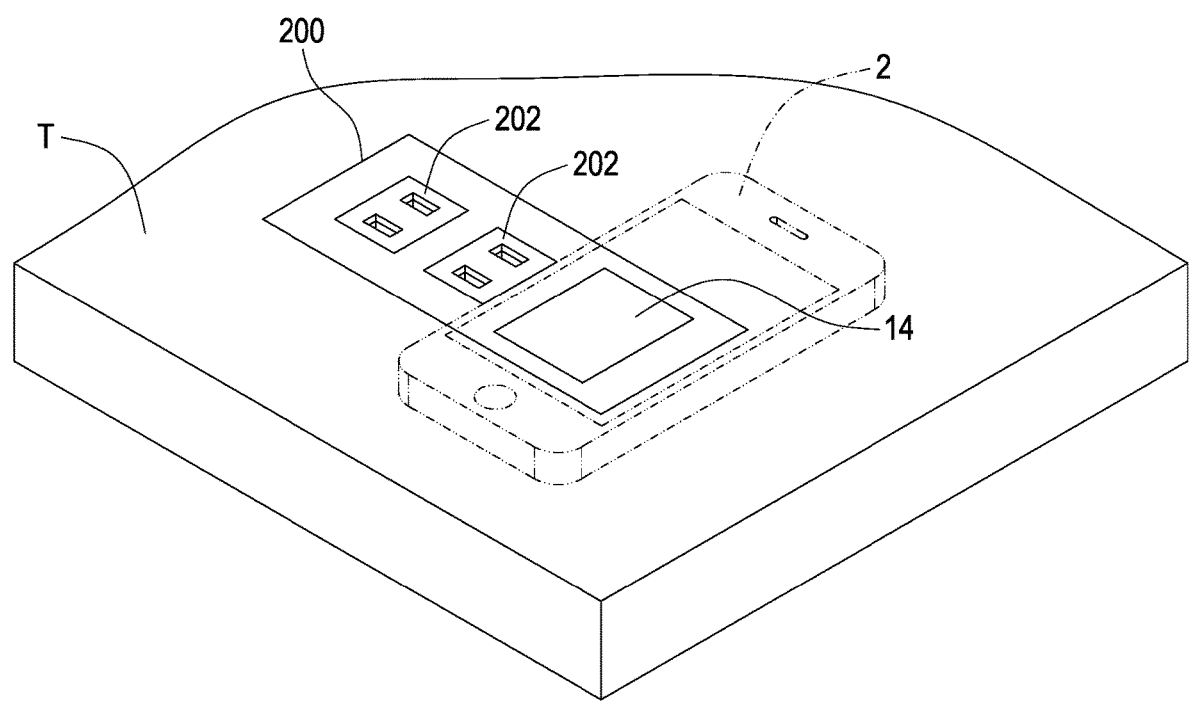
FIG. 6D is a schematic structure diagram of the wireless charging apparatus according to a tenth embodiment of the present disclosure.

Please refer to FIG. 6D, which shows a schematic structure diagram of the wireless charging apparatus according to a tenth embodiment of the present disclosure, and also refer to FIG. 1 to FIG. 6C. The power supply socket 100 is a socket arranged on a desktop surface T, and a socket module 200 is installed in the power supply socket 100. The socket module 200 includes a plurality of sockets 202 and the wireless charging apparatus 1, and the wireless charging assembly 14 is formed as a top portion of the wireless charging apparatus 1. The power coil 142 is arranged in the wireless charging assembly 14, and the electronic device 2 is placed on the wireless charging assembly 14 to be wirelessly charged. In one embodiment, the wireless charging device 1 may be in a modular design so that the wireless charging device 1 can be easily exchanged with the sockets 202 in the socket module 200 at any position. Therefore, the effect of increasing the configuration convenience of the device can be achieved. Moreover, the above-mentioned embodiments of FIG. 3A to FIG. 6D may be used in combination with each other according to actual needs.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A wireless charging apparatus with an embedded function embedded in a power supply socket, and configured to wirelessly charge an electronic device, the wireless charging apparatus comprises:
    a case, embedded in the power supply socket, and the case comprising a plug hole for a power line to be plugged into,
    a charging module, coupled to the power line, and the charging module comprising:
        a power conversion circuit, configured to receive an input voltage through the power line, and convert the input voltage into an output voltage,
        a communication module, configured to perform a handshaking communication with the electronic device to provide a handshaking signal, the communication module comprises a communication antenna or a communication coil, and the communication antenna or the communication coil and the power coil are packaged as a wireless module, and
        a controller, coupled to the power conversion circuit and the communication module, and configured to receive the handshaking signal, and wherein the controller is a power transmission controller conforming to a USB power transmission specification, and
    a wireless charging assembly, comprising a power coil, and the power coil coupled to the power conversion circuit to wirelessly transmit the output voltage to the electronic device,
    wherein after the wireless charging apparatus is activated, the controller controls the power conversion circuit to convert the input voltage into an implied output voltage, and the controllers make each other realize a power information through the handshaking communication of the communication modules, and the controller realizes a demand voltage of the electronic device according to the handshaking signal provided by the communication module; the controller controls the power conversion circuit according to the demand voltage to adjust the implied output voltage to meet the demand voltage.

2. The wireless charging apparatus as claimed in claim 1, wherein the communication module performs the handshaking communication with the electronic device by a digital modulation manner.

3. The wireless charging apparatus as claimed in claim 2, wherein the digital modulation manner is a frequency-shift keying.

4. The wireless charging apparatus as claimed in claim 1, wherein the wireless charging assembly is an accommodation seat body; the accommodation seat body is coupled to the case, and the power coil is accommodated on one surface of the accommodation seat body.

5. The wireless charging apparatus as claimed in claim 4, wherein the case comprises a sliding part and the accommodation seat body is coupled to the sliding part; the sliding part is configured for the accommodation seat body to move outwardly or inwardly relative to the case, and when the accommodation seat body moves inwardly, the accommodation seat body and the case are embedded to form a closed body.

6. The wireless charging apparatus as claimed in claim 4, wherein the accommodation seat body is pivotally connected to the case so that the accommodation seat body is turned outwardly or folded inwardly relative to the case, and when the accommodation seat body is folded inwardly, the accommodation seat body and the case are embedded to form a closed body.

7. The wireless charging apparatus as claimed in claim 1, wherein the wireless charging assembly is a bearing seat body, and the bearing seat body is coupled to the case.

8. The wireless charging apparatus as claimed in claim 7, wherein the bearing seat body is pivotally connected to the case so that the bearing seat body is turned outwardly or folded inwardly relative to the case, and when the bearing seat body is folded inwardly, the bearing seat body and the case are embedded to form a closed body.

9. The wireless charging apparatus as claimed in claim 1, wherein the wireless charging assembly comprises:
   a charging body, coupled to the charging module, and configured to accommodate the power coil, and
   a clamping component, coupled to the charging body, and configured to clamp the electronic device.

10. The wireless charging apparatus as claimed in claim 1, wherein the wireless charging assembly comprises:
   a charging body, coupled to the charging module, and configured to accommodate the power coil, and
   an attaching part, coupled to the charging body, and configured to attach the electronic device.

* * * * *